US011221216B2

United States Patent
(12) United States Patent
Sasaki et al.

(10) Patent No.: US 11,221,216 B2
(45) Date of Patent: Jan. 11, 2022

(54) PLACEMENT TABLE FOR UNMANNED AERIAL VEHICLE, SURVEYING METHOD, SURVEYING DEVICE, SURVEYING SYSTEM AND PROGRAM

(71) Applicant: Topcon Corporation, Tokyo (JP)

(72) Inventors: Takeshi Sasaki, Tokyo (JP); Nobuyuki Fukaya, Tokyo (JP); You Sasaki, Tokyo (JP)

(73) Assignee: Topcon Corporation, Tokyo (JP)

( * ) Notice: Subject to any disclaimer, the term of this patent is extended or adjusted under 35 U.S.C. 154(b) by 0 days.

(21) Appl. No.: 16/963,217

(22) PCT Filed: Feb. 14, 2019

(86) PCT No.: PCT/JP2019/005298
§ 371 (c)(1),
(2) Date: Jul. 18, 2020

(87) PCT Pub. No.: WO2019/160022
PCT Pub. Date: Aug. 22, 2019

(65) Prior Publication Data
US 2021/0131804 A1 May 6, 2021

(30) Foreign Application Priority Data
Feb. 14, 2018 (JP) ............................ JP2018-024136

(51) Int. Cl.
*G01C 11/02* (2006.01)
*B64C 39/02* (2006.01)
(Continued)

(52) U.S. Cl.
CPC ............ *G01C 11/02* (2013.01); *B64C 39/024* (2013.01); *B64D 47/08* (2013.01); *B64F 1/36* (2013.01);
(Continued)

(58) Field of Classification Search
CPC ....... G01C 11/02; B64C 39/024; H04N 7/183
(Continued)

(56) References Cited

U.S. PATENT DOCUMENTS 7,861,423 B2 1/2011 Kumagai et al.
9,171,225 B2 10/2015 Fukaya et al.
(Continued)

FOREIGN PATENT DOCUMENTS

CN 102417037 A 4/2012
EP 2433867 A2 3/2012
(Continued)

OTHER PUBLICATIONS

International Search Report and Written Opinion dated May 21, 2019, in connection with International Patent Application No. PCT/JP2019/005298, filed Feb. 14, 2019, 8 pgs (including translation).

(Continued)

*Primary Examiner* — Jeffery A Williams
(74) *Attorney, Agent, or Firm* — Chiesa Shahinian & Giantomasi PC

(57) ABSTRACT

[Problem] To obtain high measurement accuracy in aerial photogrammetry while reducing the cost of installing a measurement target. [Solution] According to the present invention, a launching pad for an unmanned aircraft on which a UAV 200 is installed before take off is provided with: a target indication that constitutes a target locating point used for aerial photogrammetry; and position determining units that determine the position of the UAV 200 with respect to the launching pad in a state in which the position of the UAV 200 with respect to the target indication before take off is specified.

10 Claims, 5 Drawing Sheets

(51) Int. Cl.

| | |
|---|---|
| ***H04N 7/18*** | (2006.01) |
| ***G06T 7/73*** | (2017.01) |
| ***G06T 7/521*** | (2017.01) |
| ***B64D 47/08*** | (2006.01) |
| ***B64F 1/36*** | (2017.01) |
| ***G01C 11/04*** | (2006.01) |

(52) U.S. Cl.

CPC .............. *G01C 11/04* (2013.01); *G06T 7/521* (2017.01); *G06T 7/74* (2017.01); *H04N 7/183* (2013.01); *B64C 2201/027* (2013.01); *B64C 2201/127* (2013.01); *G06T 2207/10032* (2013.01)

(58) Field of Classification Search

USPC .......................................................... 348/135

See application file for complete search history.

(56) References Cited

U.S. PATENT DOCUMENTS

| | | | |
|---|---|---|---|
| 9,207,069 | B2 | 12/2015 | Kitamura et al. |
| 9,523,575 | B2 | 12/2016 | Kumagai et al. |
| 9,977,983 | B2 | 5/2018 | Kochi et al. |
| 10,565,730 | B2 | 2/2020 | Sasaki et al. |
| 2009/0235541 | A1 | 9/2009 | Kumagai et al. |
| 2012/0078451 | A1 | 3/2012 | Ohtomo et al. |
| 2012/0242830 | A1 | 9/2012 | Kumagai et al. |
| 2012/0256916 | A1 | 10/2012 | Kitamura et al. |
| 2013/0236107 | A1 | 9/2013 | Fukaya et al. |
| 2014/0067162 | A1* | 3/2014 | Paulsen .................. B64C 19/00 701/2 |
| 2015/0206023 | A1 | 7/2015 | Kochi et al. |
| 2017/0032686 | A1 | 2/2017 | Alonso et al. |
| 2018/0172843 | A1 | 6/2018 | Nishita et al. |
| 2018/0197421 | A1 | 7/2018 | Ogawa et al. |
| 2018/0204469 | A1 | 7/2018 | Moster et al. |
| 2019/0068953 | A1* | 2/2019 | Choi .................. G01B 11/2545 |
| 2019/0073794 | A1 | 3/2019 | Sasaki et al. |

FOREIGN PATENT DOCUMENTS

| | | | |
|---|---|---|---|
| JP | 2009-229192 | A | 10/2009 |
| JP | 2012-071645 | A | 4/2012 |
| JP | 2012-202821 | A | 10/2012 |
| JP | 2012-230594 | A | 11/2012 |
| JP | 5124319 | B2 | 1/2013 |
| JP | 2013-178656 | A | 9/2013 |
| JP | 2013-186816 | A | 9/2013 |
| JP | 2014-006148 | A | 1/2014 |
| JP | 2014-035702 | A | 2/2014 |
| JP | 2016-017931 | A | 2/2016 |
| JP | 2018-100931 | A | 6/2018 |
| JP | 2018-112445 | A | 7/2018 |
| JP | 2019-045425 | A | 3/2019 |
| WO | 2011070927 | A1 | 6/2011 |
| WO | 2019026169 | A1 | 2/2019 |

OTHER PUBLICATIONS

Extended European Search Report dated Oct. 14, 2021, in connection with European Patent Application No. 19754553.6, filed Feb. 14, 2019, 8 pgs.

* cited by examiner

PLACEMENT TABLE FOR UNMANNED AERIAL VEHICLE, SURVEYING METHOD, SURVEYING DEVICE, SURVEYING SYSTEM AND PROGRAM

CROSS-REFERENCE TO RELATED APPLICATIONS

This application is a national stage under 35 U.S.C. § 371 of International Patent Application No. PCT/JP2019/005298, filed Feb. 14, 2019, which claims priority to Japanese Patent Application No. 2018-024136, filed Apr. 14, 2018, the disclosure of both is incorporated herein by reference in its entirety.

TECHNICAL FIELD

The present invention relates to a technique for aerial photogrammetry.

BACKGROUND ART

Technologies using an unmanned aerial vehicle (UAV) in aerial photogrammetry are publicly known. In these techniques, a three-dimensional model of an object to be surveyed is generated by using photographic images of the object, which are obtained by a UAV. The object to be surveyed is, for example, a ground surface. According to this technique, first orientation is performed by using multiple photographic images containing the same object, to calculate exterior orientation parameters (location and attitude) of a camera mounted on the UAV. Then, a process relating to generation of a three-dimensional model is performed by using these exterior orientation parameters. The technique of calculating exterior orientation parameters of a camera in the field of aerial photogrammetry is disclosed in, for example, Patent Literature 1.

CITATION LIST

Patent Literature

Patent Literature 1: Japanese Unexamined Patent Application Laid-Open No. 2014-6148.

Patent Literature 2: Japanese Patent Application No. 2017-171289

SUMMARY OF INVENTION

Technical Problem

According to an existing technique, multiple orientation targets are installed on a ground surface, and the locations of the orientation targets are measured in advance. In this condition, exterior orientation parameters of a camera corresponding to each of aerial photographic images are calculated by a method of resection by use of orientation targets contained in the aerial photographic images. This technique has a drawback in the costs relating to installation and positioning of the orientation targets. Moreover, installation of the orientation targets may be difficult, depending on geographic features.

In one example, a true scale can be added to a three-dimensional model without using an orientation target, by tracking and positioning a UAV by a total station (TS) (for example, refer to Patent Literature 2). However, in a case of requiring high accuracy of a three-dimensional model finally obtained, it is desirable to install at least one orientation target on a ground and to perform adjustment calculations using location data of the installed orientation target as a constraining point.

In view of these circumstances, an object of the present invention is to provide a technique that enables obtaining high surveying accuracy while reducing cost relating to installation of orientation targets in aerial photogrammetry.

Solution to Problem

A first aspect of the present invention provides a placement table for an unmanned aerial vehicle, on which an unmanned aerial vehicle is to be placed. The placement table includes a target display function that constitutes a control point to be used in aerial photogrammetry and includes one or both of a structure and an indication that determine a position of the unmanned aerial vehicle relative to the placement table in a condition in which a position of the unmanned aerial vehicle relative to the target display function prior to flight is determined.

According to a second aspect of the present invention, in the first aspect of the present invention, the unmanned aerial vehicle may include a reflection target to be used in laser positioning, and placing the unmanned aerial vehicle on the placement table may determine a position relationship between the target display function and the reflection target.

According to a third aspect of the present invention, in the second aspect of the present invention, a location of the placement table may be determined by positioning the reflection target.

A fourth aspect of the present invention provides a surveying method using the placement table for the unmanned aerial vehicle according to any one of the first to the third aspects of the present invention. The surveying method includes a first step of measuring a location of the unmanned aerial vehicle in a condition of being placed on the placement table, a second step of determining a location of the placement table on the basis of the result of the first step, a third step of photographing the placement table and an object for aerial photogrammetry, from the unmanned aerial vehicle that is flying, and a fourth step of calculating three-dimensional data of the object on the basis of the location of the placement table, which is obtained in the second step, as well as the photographic images, which are obtained in the third step.

According to a fifth aspect of the present invention, in the fourth aspect of the present invention, a relationship between a position of the unmanned aerial vehicle and a position of the placement table in a condition in which the unmanned aerial vehicle is placed on the placement table, may be preliminarily determined, and a location of the placement table may be determined on the basis of the preliminarily determined relationship and a location of the unmanned aerial vehicle that is positioned in the condition of being placed on the placement table.

According to a sixth aspect of the present invention, the fourth step in the fourth or the fifth aspect of the present invention may use the placement table as a control point.

According to a seventh aspect of the present invention, in the fourth step in any one of the fourth to the sixth aspects of the present invention, the fourth step may include adjustment calculation that uses the location of the placement table as a constraining point to optimize exterior orientation parameters and interior orientation parameters of a camera that photographs the object for the aerial photogrammetry.

An eighth aspect of the present invention provides a surveying device including a location data receiving unit, a location determining unit, an image data receiving unit, and a calculator. The location data receiving unit receives location data of an unmanned aerial vehicle in a condition of being placed on the placement table for the unmanned aerial vehicle according to any one of the first to the third aspects of the present invention. The location determining unit determines a location of the placement table on the basis of the location data of the unmanned aerial vehicle. The image data receiving unit receives image data of photographic images of the placement table and an object for aerial photogrammetry, which are obtained by the unmanned aerial vehicle that is flying. The calculator calculates three-dimensional data of the object for the aerial photogrammetry on the basis of the location of the placement table and the image data.

A ninth aspect of the present invention provides a surveying system using the placement table for the unmanned aerial vehicle according to any one of the first to the third aspects of the present invention. The surveying system includes a unit that measures a location of the unmanned aerial vehicle in a condition of being placed on the placement table and includes a unit that determines a location of the placement table on the basis of the location of the unmanned aerial vehicle. The surveying system also includes a unit that photographs the placement table and an object for aerial photogrammetry, from the unmanned aerial vehicle that is flying and includes a unit that calculates three-dimensional data of the object for the aerial photogrammetry on the basis of the location of the placement table and the obtained photographic images.

A tenth aspect of the present invention provides a program to be read by a computer processor. The program, when executed by the computer processor, causes the computer processor to receive location data of an unmanned aerial vehicle in a condition of being placed on the placement table for the unmanned aerial vehicle according to any one of the first to the third aspects of the present invention. The program, when executed by the computer processor, also causes the computer processor to determine a location of the placement table on the basis of the location data of the unmanned aerial vehicle, receive image data of photographic images of the placement table and an object for aerial photogrammetry, which are obtained by the unmanned aerial vehicle that is flying, and calculate three-dimensional data of the object for the aerial photogrammetry on the basis of the location of the placement table and the obtained photographic images.

Advantageous Effects of Invention

The present invention enables providing a technique by which high surveying accuracy is obtained while cost relating to installation of orientation targets is reduced in aerial photogrammetry.

DESCRIPTION OF EMBODIMENTS

1. First Embodiment

Overview

Figure 1:
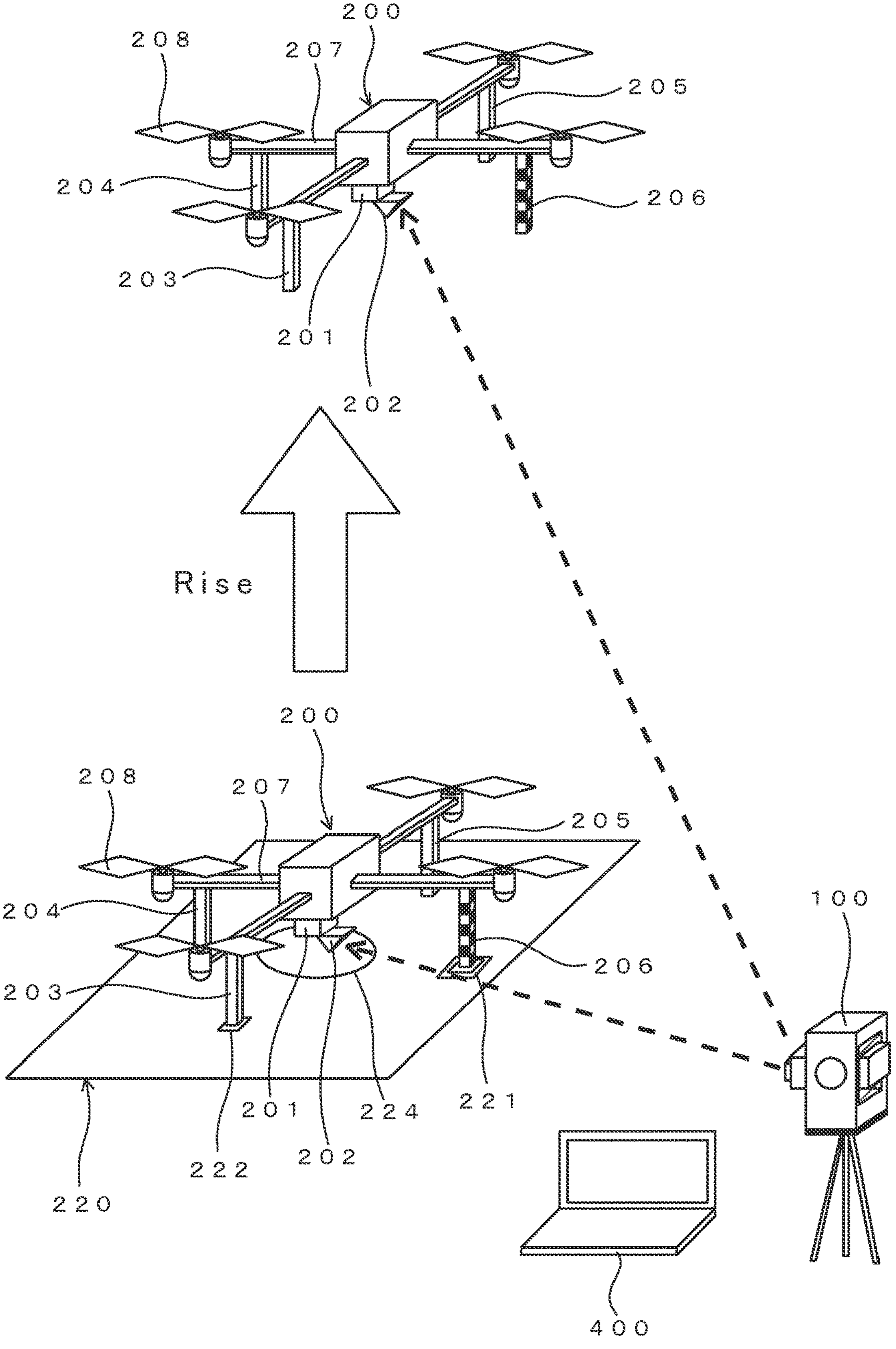
FIG. 1 is a general conceptual view of an embodiment.

FIG. 1 shows a general overview of an embodiment. FIG. 1 shows a total station (TS) 100, a UAV 200, a launching table 220 for the UAV 200, and a surveying data processing device 400 which uses a personal computer (PC). The UAV 200 performs photographing of a ground by using a camera 201 while the UAV 200 is flying. The UAV 200 is tracked by the total station (TS) 100, and a three-dimensional location of the UAV 200 is sequentially measured. The TS 100 tracks the UAV 200 in such a manner as to track a reflection prism 202 mounted on the UAV 200, with tracking light. The TS 100 positions the UAV 200 by calculating a direction and a distance of the UAV 200 as viewed from the TS 100, in laser distance measurement targeting the reflection prism 202. The reflection prism 202 is an optical target using a corner cube and reflects incident light back by 180 degrees.

The TS 100 is installed at a known three-dimensional location in the absolute coordinate system. Thus, measuring the direction and the distance of the UAV 200 as viewed from the TS 100 enables determination of a three-dimensional location of the UAV 200 in the absolute coordinate system. Specifically, distance measuring laser light is emitted from the TS 100 to the reflection prism 202 of the UAV 200. This laser light is reflected by the reflection prism 202 and is then received by the TS 100. The distance from the TS 100 to the reflection prism 202 is calculated from a phase difference due to the difference in light reception timing between the laser light that has reflected back and reference light that has propagated through a reference optical path provided in the TS 100. The direction of the reflection prism 202 as viewed from the TS 100 is determined from the direction of an optical axis of the TS 100 at that time. Then, the location of the reflection prism 202 relative to the TS 100 is calculated from the distance and the direction of the reflection prism 202. The location of the TS 100 in the absolute coordinate system is already known, and therefore, in the condition in which the location of the reflection prism 202 relative to the TS 100 is clear, the location of the reflection prism 202 in the absolute coordinate system is determined. This is the principle of the laser distance measurement for the reflection prism 202.

The absolute coordinate system describes map information and is fixed relative to the ground, and therefore, the absolute coordinate system can also be called a "map coordinate system". In one example, a coordinate system used by a GNSS is the absolute coordinate system or the map coordinate system. The absolute coordinate system may be described in terms of latitude, longitude, and altitude or height above mean sea level. In an example of directions of coordinate axes of the absolute coordinate system, the X-axis is set to be directed to the east, the Y-axis is set to be directed to the north, and the Z-axis is set to be directed vertically upward. A local coordinate system may also be used.

The total station (TS) 100 used is a commercially available one. Details of the TS 100 are disclosed in, for example, Japanese Unexamined Patent Applications Laid-Open Nos. 2009-229192 and 2012-202821. Techniques for making the TS 100 track and position the UAV 200 are disclosed in, for example, Japanese Patent Applications Nos. 2016-247917 and 2017-002419. In addition, a technique relating to detection and tracking of a target, such as the reflection prism 202, by a TS, is disclosed in, for example, Japanese Patent No. 5124319.

The UAV 200 is constituted by mounting a camera 201 and a reflection prism 202 to a commercially available aerial vehicle. The UAV 200 includes a flight control unit, an inertial measurement unit (IUM), a storage for storing a flight plan, a flight log, etc., a wireless communication unit, and a GNSS location identifying unit. Relationships of position and attitude among the camera 201, the reflection prism 202, the IMU, and the GNSS location identifying unit in the UAV 200 are preliminarily examined, and this data is stored in the surveying data processing device 400 in advance.

The UAV 200 includes a storage for storing a flight plan and a flight log. The flight plan is data containing predetermined coordinates of points to be passed through and predetermined speeds at these points. The flight log stores data of a flight path measured by the GNSS unit, photographing data, and data of attitude of the UAV 200 measured by the IMU at the photographing time.

The UAV 200 includes legs 203, 204, 205, and 206. The leg 206 is designed with a pattern so as to be distinguishable from the legs 203, 2040, and 205. The direction of the UAV 200 is determined by recognizing the leg 206.

The UAV 200 flies in accordance with a predetermined flight plan and photographs an object to be subjected to aerial photogrammetry, e.g., a ground surface, by using the camera 201 while in flight. The photographing is performed at a time interval, such as every one second or every two seconds, whereby large numbers of photographic images that contain the same photographed object that is incrementally shifted in the photographic images are obtained along a flight path. The data of the photographic images taken by the camera 201 is stored in a flight log in conjunction with data of photographing time, attitude of the UAV 200 or of the camera 201 measured by the IMU at the photographing time, and location of the UAV 200 or of the camera 201 measured by the GNSS location identifying unit at the photographing time. The flight log data is collected after the flight is completed, and the collected flight log data is processed by the surveying data processing device 400.

The launching table 220 functions as a launching table and an orientation target of the UAV 200. The launching table 220 has a target display function so as to function as a target for a control point to be used in aerial photogrammetry. In this example, the launching table is provided with a target display 224 for facilitating identification of the launching table in an aerial photograph taken by the camera 201. The target display 224 functions as a control point in aerial photogrammetry. Those that are easy to distinguish as images are selected for the shape and the color of the target display. A color code target or a bar code display may also be used as the target display.

The launching table 220 includes positioning parts 221 and 222. The positioning part 221 has a recess for receiving the leg 206. The positioning part 222 has a recess for receiving the leg 203. The two recesses are designed to have shapes different from each other, and thus, the positioning part 221 can receive the leg 206 but cannot receive the leg 203 because the shape does not match the shape of the leg 203. Similarly, the positioning part 222 can receive the leg 203 but cannot receive the leg 206 because the shape does not match the shape of the leg 206. This uniquely determines the position and the attitude of the UAV 200 relative to the launching table 220 in placing the UAV 200 on the launching table 220. In particular, this structure uniquely determines the position of the reflection prism 202 relative to the launching table 220 in placing the UAV 200 on the launching table 220.

In the condition in which the UAV 200 is placed on the launching table 220, relationships among the position of the launching table 220 or the center position of the target display 224, the position of the UAV 200, e.g., the position of the IMU mounted thereon, the position of the camera 201, and the position of the reflection prism 202 are uniquely determined. These relationships are obtained in advance as known data and are stored in a storage 311 (refer to FIG. 4) of the surveying data processing device 400.

To increase the accuracy of aerial photogrammetry, the accuracy of the exterior orientation parameters (location and attitude) of the camera 201 at the photographing time of each image should be considered. In this embodiment, the accuracy of the exterior orientation parameters of the camera 201 is increased by the following procedure.

General Description of Processing Flow (1) Start of Flight

First, the UAV 200 is placed on the launching table 220. At this time, the positioning parts 221 and 222 are used to set the attitude and the position of the UAV 200 on the launching table 220 to predetermined conditions. In the condition in which the setting of the UAV 200 is finished, that is, in the condition ready for flight, the TS 100 captures the reflection prism 202 of the UAV 200 and starts tracking and positioning. The positioning data of the reflection prism 202 in the condition ready for flight provides the location of the reflection table 220 as a control point, in this case, the center location of the target display 224. This value is acquired as a constraining point that is used in adjustment calculation later.

Thereafter, a flight is started. The flight is performed in accordance with a predetermined flight plan, and the camera 201 photographs a ground surface during the flight. The photographing timing and the flight course are set so that an image of the launching table 220 will be included in obtained aerial photographic images.

(1) Relative Orientation

With use of aerial photographic images, a relative three-dimensional model with a freely selected scale is generated, and a relative relationship between a feature point identified among multiple images and a location and an attitude of the camera 201 at the photographing time of each of the multiple images is determined.

(2) Absolute Orientation

The location of the camera 201 that is positioned by the TS 100, which is represented by the location of the reflection prism, is used to add a scale and actual values to the relative three-dimensional model, which is generated by the relative orientation of the process (1), and absolute values of the exterior orientation parameters in the absolute coordinate system of the camera 201 are calculated.

(3) Adjustment Calculations

A bundle adjustment calculation as well as an adjustment calculation in consideration of a position relationship between the reflection prism and the camera are performed concurrently so that location of feature points, exterior orientation parameters, and interior orientation parameters will be optimized. In the adjustment calculations, the location of the launching table 220, which is acquired prior to start of the flight, is used as a constraining point.

The adjustment calculations may be performed in consideration of other correction factors. In one example, the calculations may be performed in consideration of a deviation of a position of a reflection point on the reflection prism 202. The deviation depends on incident angles of the distance measuring light and the tracking light from the TS 100 (for example, refer to Japanese Patent Application No. 2017-171289).

Details of Each Process

(1) Relative Orientation

The following describes relative orientation using two images that are obtained by photographing the same object, but at different locations. The two images are represented as “stereoscopic images” hereinafter. This relative orientation uses two images for simplicity of explanation. It is assumed that the UAV 200 consecutively photographs a ground surface by using the camera 201 while flying and obtains a great number of aerial photographic images. In this case, two aerial photographic images containing the same photographed area and photographed at very short time intervals are selected as stereoscopic images. The UAV 200 successively performs photographing, and therefore, the stereoscopic images are two images that are obtained at different viewpoint locations and that contain the same object.

Figure 2:
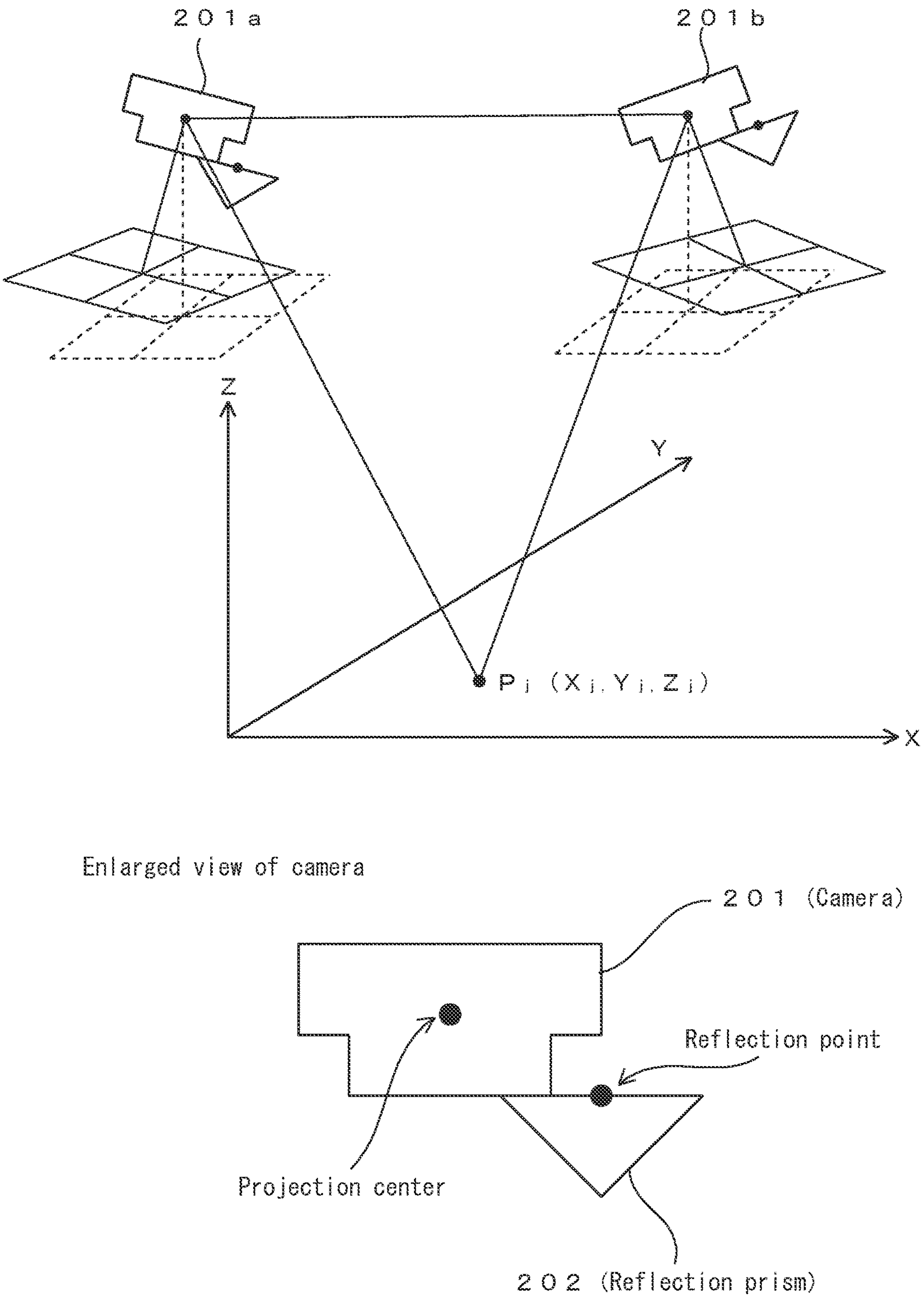
FIG. 2 is an image diagram showing a principle of orientation.

FIG. 2 is an image diagram showing a case in which a camera 201*a* representing the camera 200 at time t1 photographs an area of a ground surface and a camera 201*b* representing the camera 200 at time t2 also photographs the same area. The time t2 is after the time t1.

In this process, first, feature points are extracted from each of a first image and a second image that are respectively taken by the cameras 201*a* and 201*b*. Then, correspondence relationships of the feature points between the first and the second images are determined. These techniques are disclosed in, for example, Japanese Unexamined Patent Applications Laid-Open Nos. 2013-186816 and 2013-178656. Japanese Unexamined Patent Application Laid-Open No. 2013-186816 discloses details of, e.g., extraction of feature points, matching of the feature point between two images, methods of intersection and resection, each type of orientation, calculation of a three-dimensional location of the feature point, and bundle adjustment.

FIG. 2 shows a common feature point $P_j$ that is extracted from the first and the second images. Although a great number of feature points commonly contained in both of the two images are extracted, only one feature point P is shown in FIG. 2 for simplicity of explanation herein.

In the relative orientation, directions and locations of the cameras 201*a* and 201*b* are examined and adjusted so that a location difference of the feature point between the first and the second images, respectively, taken by the cameras 201*a* and 201*b*, will be eliminated, and relative exterior orientation parameters (location and attitude) of the cameras 201*a* and 201*b* are calculated. At this time, the relative exterior orientation parameters of the cameras 201*a* and 201*b* are examined by using data of attitudes of the cameras 201*a* and 201*b* at the photographing time of each image, as initial values. The data of the attitudes of the cameras 201*a* and 201*b* is obtained from data of attitude of the UAV 200 measured by the IMU of the UAV 200. At this stage, a true scale, such as coordinate values and values of the attitude in the absolute coordinate system, is not obtained, and therefore, the obtained exterior orientation parameters represent a relative location relationship and a relative attitude (direction) relationship between the cameras 201*a* and 201*b*.

In the case shown in FIG. 2, the relative orientation determines a relative location relationship between the camera 201*a*, the camera 201*b*, and the feature point $P_j$, that is, two angles that form a triangle shape with vertexes at the cameras 201*a* and 201*b* and the feature point $P_j$. The size of the triangle is not determined, and the triangle is a relative figure, because a true scale is still not provided.

The relative orientation is performed on all of usable photographic images that are taken by the camera 201, whereby relative exterior orientation parameters of the camera 201 at each of the locations of the viewpoints corresponding to the photographic images are provided. Although an example of the relative orientation using two images as stereoscopic images is described above, the relative orientation is performed by using three or more images containing the same object, in actual use.

Figure 3:
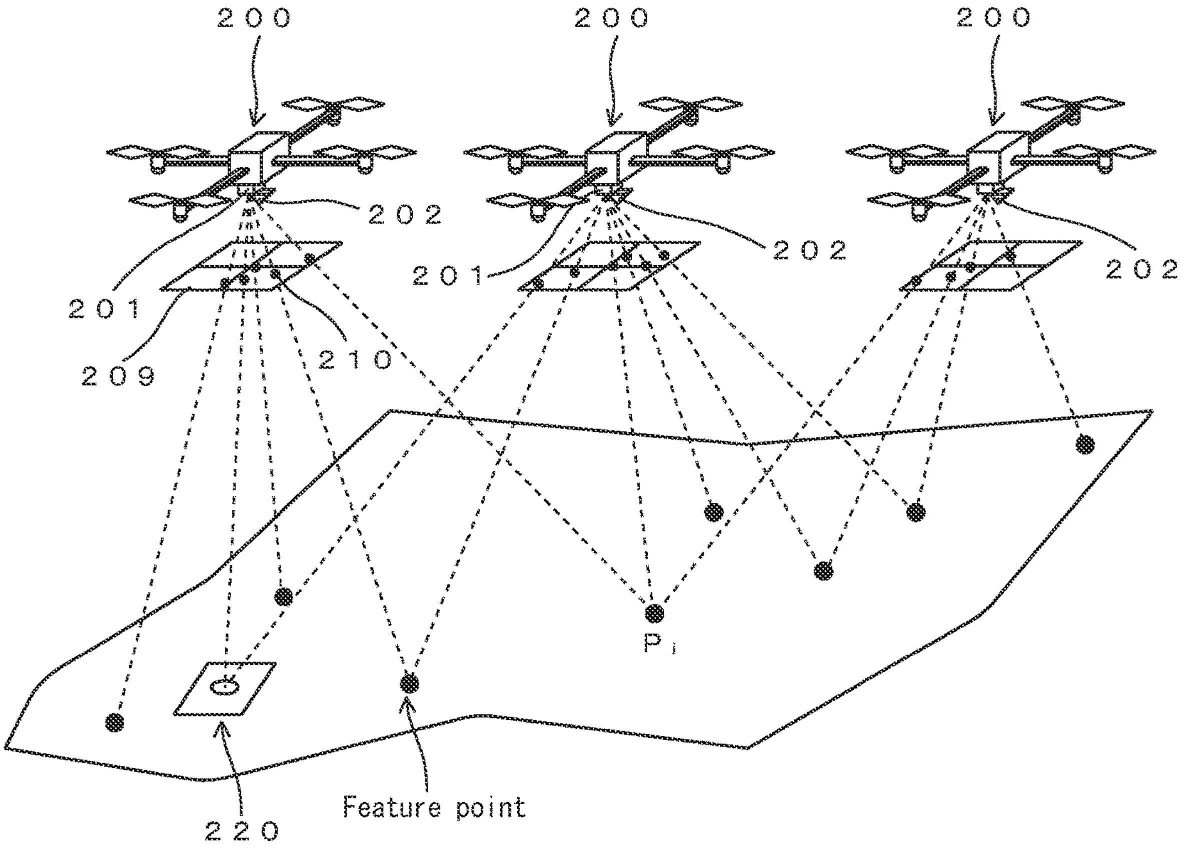
FIG. 3 is an image diagram showing a principle of orientation.

The relative location relationship and the relative attitude relationship are obtained with respect to each of locations of the camera corresponding to respective multiple images. This provides a relative three-dimensional model in which relative relationships between the great number of feature points and the locations and the attitudes of the camera are determined. FIG. 3 conceptually shows a principle for generating a relative three-dimensional model in which a relative relationship of location and direction between cameras taking multiple images and a relative relationship of location between feature points common to the multiple images are determined. This relative three-dimensional model does not have a true scale, and a relationship of the relative three-dimensional model to the absolute coordinate system is not yet known at the stage of the relative orientation.

FIG. 3 shows a situation in which the launching table 220 is also extracted from a photograph screen 209 and is used as a control point. The black points 210 in the photograph screen 209 are points representing feature points and the launching table 220 in the photograph screen. A collinearity condition, which will be described later, is such that a light bundle connecting three points, which are the launching table 220 or a feature point of an object to be measured, a point 210 in the image, and a projection center or an optical origin of the camera 201, must be on the same straight line.

The relative orientation may be performed by using the launching table 220 or the target display 224 other than the feature point. In this case, the relative orientation is performed by using the launching table 220 or the target display 224 as a control point. In this process, first, an image of the launching table 220 or of the target display 224 is extracted from a photographic image taken by the camera 201. This process is performed by using a publicly known image recognition technique. This process is performed on multiple photographic images that contain the launching table 220. Then, the relative orientation as described above is performed by assuming that the location of the launching table 220 or of the target display 224 is $P_j$ in FIG. 2.

(2) Absolute Orientation

If locations in the absolute coordinate system of the multiple feature points in FIG. 3 are determined, a true scale is added to the relative model in FIG. 3, and the direction in the absolute coordinate system of the camera 201 is also determined. This is a principle of an absolute orientation using orientation targets, which is conventionally performed.

In this embodiment, a true scale is added to the relative orientation-based relative three-dimensional model without using an orientation target, which is conventionally used. Thus, the relative three-dimensional model, as shown in FIG. 3, can be described in the absolute coordinate system. The following describes absolute orientation of this embodiment.

In this process, a movement trajectory of the camera 201 in the relative three-dimensional model shown in FIG. 3 is considered. As shown in FIG. 1, in this embodiment, the movement trajectory of the camera 201 or of the reflection prism 202 of the UAV 200 is tracked and positioned by the TS 100, and thus, the trajectory is determined in the absolute coordinate system.

Based on this, the location of the reflection prism 202 is used as the location of the camera 201, and scale adjustment, parallel movement, and rotational movement of the relative three-dimensional model are performed so that the movement trajectory of the camera 201 in the relative three-dimensional model will be fit to the movement trajectory of the camera 201 in the absolute coordinate system, which is positioned by the TS 100.

The fitting of the movement trajectory of the camera 201 in the relative three-dimensional model to the positioning data obtained by the TS 100 enables the movement trajectory of the camera 201 in the relative three-dimensional model to be described in the absolute coordinate system. In this embodiment, the movement trajectory is a trajectory of the location of the camera 201 at each time. Thus, a true scale and actual values are added to the locations of the camera in the relative three-dimensional model. Adding actual values to each of the locations of the camera in the relative three-dimensional model provides values in the absolute coordinate system of each of attitudes of the camera in the relative three-dimensional model. Moreover, actual location of each of the feature points in the relative three-dimensional model is also obtained. This process thus provides actual values in terms of absolute value in the absolute coordinate system for each of the parameters in the relative orientation-based relative three-dimensional model.

In the present specification, actual values in the absolute coordinate system are used as absolute values. For example, latitude, longitude, and altitude are used for the absolute values of a location. The direction of a vector in an XYZ coordinate system having an X-axis in the north direction, a Y-axis in the east direction, and a Z-axis in the vertical upward direction is an absolute value of an attitude. Alternatively, a local coordinate system such as a coordinate system having an origin at the TS 100, that is, a TS coordinate system, can be used instead of the absolute coordinate system. In this case, absolute values of the feature points and of the exterior orientation parameters of the camera 201 are described in the local coordinate system such as the TS coordinate system.

The relative three-dimensional model obtained by the principle in FIG. 3 contains an error, and use of the location of the prism 202 as the location of the camera 201 also causes an error in the absolute orientation. These cause the fitting of the trajectory of the location of the camera in the absolute orientation to be imperfect and to contain an error. Consequently, values of the feature points and of the exterior orientation parameters of the camera 201, which are obtained by the absolute orientation, also contain errors.

As described above, the absolute orientation of this embodiment uses the movement trajectory of the camera 201 to provide values in the absolute coordinate system to the movement trajectory of the camera 201 in the relative three-dimensional model used in the relative orientation, thereby adding a true scale to the relative three-dimensional model. That is, the relative three-dimensional model used in the relative orientation is subjected to coordinate conversion to locations of the camera located by the TS 100, whereby the scale and the direction of the relative three-dimensional model are determined in the absolute coordinate system.

The absolute orientation determines three-dimensional locations of the feature points in each image and determines the exterior orientation parameters (location and attitude) of the camera 201 corresponding to each image.

In the process of adding a true scale to the relative three-dimensional model in the absolute orientation, the location of the reflection table 220 may be used as a constraining point. In this case, a constraining condition in the process of adding a true scale to the relative three-dimensional model is added, whereby calculation efficiency and calculation accuracy of this process are increased.

(3) Adjustment Calculations

The locations of the feature points, and the exterior orientation parameters, which are obtained by the absolute orientation of the process (2), contain errors. To reduce these errors, adjustment calculations described below are performed. Internal orientation parameters, which are picture distance, location of a main point, and distortion parameters, are also optimized as unknown parameters in the adjustment calculations. In the adjustment calculations, observation equations represented by the First to the Third Formulas are established, and each of the parameters, that is, the feature point ($X_j$, $Y_j$, $Z_j$), the exterior orientation parameters ($X_{oi}$, $Y_{oi}$, $Z_{oi}$, $a_{11i}$ to $a_{33i}$), and the interior orientation parameters (c, $x_p$, $y_p$, $k_1$ to $k_3$, $p_1$ to $p_2$), are optimized by the least-squares method. The parameters ($a_{11i}$ to $a_{33i}$) are of a rotation matrix. Although the First Formulas show $\Delta x_{ij}$ and $\Delta y_{ij}$ that are correction formulas of the Brown's distortion model, other distortion model may be used.

First Formulas $$\sum_{i=1}^{m}\sum_{j=1}^{n}\left\{-c\frac{a_{11i}(X_j-X_{oi})+a_{12i}(Y_j-Y_{oi})+a_{13i}(Z_j-Z_{oi})}{a_{31i}(X_j-X_{oi})+a_{32i}(Y_j-Y_{oi})+a_{33i}(Z_j-Z_{oi})}-x_{ij}+\Delta x_{ij}\right\}^2$$

$$\sum_{i=1}^{m}\sum_{j=1}^{n}\left\{-c\frac{a_{21i}(X_j-X_{oi})+a_{22i}(Y_j-Y_{oi})+a_{21i}(Z_j-Z_{oi})}{a_{31i}(X_j-X_{oi})+a_{32i}(Y_j-Y_{oi})+a_{33i}(Z_j-Z_{oi})}-y_{ij}+\Delta y_{ij}\right\}^2$$

Here, $$\Delta x_{ij}=(k_1r_{ij}^2+k_2r_{ij}^4+k_3r_{ij}^6)\overline{x_{ij}}+p_1(r_{ij}^2+2\overline{x_{ij}}^2)+2p_2\overline{x_{ij}y_{ij}}$$

$$\Delta y_{ij}=(k_1r_{ij}^2+k_2r_{ij}^4+k_3r_{ij}^6)\overline{y_{ij}}+2p_1\overline{x_{ij}}\overline{y_{ij}}+p_2(r_{ij}^2+2\overline{y_{ij}}^2)$$

$$\overline{x_{ij}}=x_{ij}-x_p$$

$$\overline{y_{ij}}=y_{ij}-y_p$$

$$r_{ij}=\sqrt{\overline{x_{ij}}^2+\overline{y_{ij}}^2}$$

($\overline{x_{ij}}$, $\overline{y_{ij}}$): Coordinates in a photograph screen of a target feature point, which are based on an origin at coordinates of a location of a main point $r_{ij}$: Distance between coordinates of the location of the main point and $(\overline{x_{ij}},\overline{y_{ij}})$ c: a picture distance or a focal distance $(X_j, Y_j, Z_j)$: three-dimensional coordinates of a target feature point $(x_{ij}, y_{ij})$: image coordinates of a point "j" in an image "i"

$(X_{oi}, Y_{oi}, Z_{oi})$: a location of the camera 201 at the photographing time of the image "i"

$(a_{11i}$ to $a_{33i})$: a rotation matrix showing an attitude of the camera 201 at the photographing time of the image "i"

$(\Delta x_{ij}, \Delta y_{ij})$: correction amounts relating to internal orientation parameters $(x_p, y_p)$: coordinates of a location of a main point $(k_1$ to $k_3)$: distortion parameters in a radial direction $(p_1$ to $p_2)$: distortion parameters in a tangental direction Second Formulas $$\sum_{i=1}^{m}\{X_{oi}-(X_{pi}+a_{11i}L_X+a_{12i}L_Y+a_{13i}L_Z)\}^2$$

$$\sum_{i=1}^{m}\{Y_{oi}-(Y_{pi}+a_{21i}L_X+a_{22i}L_Y+a_{23i}L_Z)\}^2$$

$$\sum_{i=1}^{m}\{Z_{oi}-(Z_{pi}+a_{31i}L_X+a_{32i}L_Y+a_{33i}L_Z)\}^2$$

$(X_{pi}, Y_{pi}, Z_{pi})$: a location of the reflection prism 202 at the photographing time of the image "i" $(L_X, L_Y, L_Z)$: a separated distance between the position of the camera or the projection center, and a reflection point of the reflection prism.

Third Formulas $$\sum_{j=1}^{n}(X_j-X_{Gj})^2$$

$$\sum_{j=1}^{n}(Y_j-Y_{Gj})^2$$

$$\sum_{j=1}^{n}(Z_j-Z_{Gj})^2$$

$(X_{Gj}, Y_{Gj}, Z_{Gj})$: a location of the launching table 220

The First Formulas use three-dimensional coordinates of the feature point in the absolute orientation-based three-dimensional model in the absolute coordinate system, as initial values for $(X_j, Y_j, Z_j)$. The initial values for $(X_{oi}, Y_{oi}, Z_{oi})$ use a location of the camera 201 in the absolute orientation-based three-dimensional model. The initial values for $(a_{11i}$ to $a_{33i})$ use values of the rotation matrix showing the attitude of the camera 201 in the absolute orientation-based three-dimensional model. The values for $(X_{pi}, Y_{pi}, Z_{pi})$ use the data of location of the reflection prism 202 that is positioned in the condition in which the UAV 200 is placed on the launching table 220 prior to the start of flight.

The three-dimensional coordinates of the launching table 220 or of the target display 224 may also be used in addition to the feature points extracted from the photographic image, as $(X_j, Y_j, Z_j)$. In this case, $(x_{ij}, y_{ij})$ represent coordinates in the image "i" of the launching table 220 or of the target display 224. The launching table 220 or the target display 224 is precisely positioned by the TS 100 prior to the start of flight of the UAV 200. Containing a point that is precisely positioned, in the observation points, suppresses calculation error, even though only one point is contained in the observation points.

The First Formulas are observation equations for performing a bundle adjustment calculation. In the bundle adjustment calculation, the observation equations of the First Formulas are established for each one light bundle of each image on the basis of the collinearity condition in which a light bundle connecting three points, that is, a feature point of an object to be measured, a point in the image, and a projection center, must be on the same straight line. Then, coordinates (Xj, Yj, Zj) of the feature point, and the exterior orientation parameters $(X_{oi}, Y_{oi}, Z_{oi}, a_{11i}$ to $a_{33i})$ and the interior orientation parameters $(c, x_p, y_p, k_1$ to $k_3, p_1$ to $p_2)$ of the camera 201, are adjusted concurrently by the least-squares method.

The Second Formulas are observation equations for performing an adjustment calculation in consideration of the difference of the position between the camera 201 and the reflection prism 202. The parameters $(L_X, L_Y, L_Z)$ are known parameters that determine the position relationship or the offset relationship between the camera 201 and the reflection prism 202 in a coordinate system fixed relative to the UAV 200.

The Third Formulas represent constraining of coordinates $(X_j, Y_j, Z_j)$ of a feature point by using the location $(X_{Gj}, Y_{Gj}, Z_{Gj})$ of the launching table 220 as a reference point or a control point. The coordinates $(X_j, Y_j, Z_j)$ of the feature point, which are values calculated by use of the relative orientation and the absolute orientation, contains an error. On the other hand, the location $(X_{Gj}, Y_{Gj}, Z_{Gj})$ of the launching table 220 is precisely positioned by the TS 100. Thus, coordinates $(X_j, Y_j, Z_j)$ are calculated such that residuals as a result of calculation of the Third Formulas for each of the feature points will be sufficiently small or changes in the residuals from residuals of previous calculation will be sufficiently small, that is, changes in the calculation results will converge. This reduces the error in the location of the feature point, and this is reflected in the First and the Second Formulas that are concurrently calculated. As a result, accuracies of the exterior orientation parameters $(X_{oi}, Y_{oi}, Z_{oi}, a_{11i}$ to $a_{33i})$ and the interior orientation parameters $(c, x_p, y_p, k_1$ to $k_3, p_1$ to $p_2)$ of the camera 201 are increased.

In the adjustment calculations using the First to the Third Formulas, the feature point $(X_j, Y_j, Z_j)$, and the exterior orientation parameters $(X_{oi}, Y_{oi}, Z_{oi}, a_{11i}$ to $a_{33i})$ and the interior orientation parameters $(c, x_p, y_p, k_1$ to $k_3, p_1$ to $p_2)$ of the camera 201, are used as parameters to calculate residuals of the First to the Third Formulas. The parameters $(a_{11i}$ to $a_{33i})$ are of a rotation matrix showing an attitude. At this time, a combination of $(X_j, Y_j, Z_j)$, $(X_{oi}, Y_{oi}, Z_{oi}, a_{11i}$ to $a_{33i})$, and $(c, x_p, y_p, k_1$ to $k_3, p_1$ to $p_2)$ is searched for so that the residuals will converge by the least-squares method. Specifically, parallel calculations of the First to the Third Formulas are repeatedly performed by adding correction amounts to each of the parameters (Xj, Yj, Zj), $(X_{oi}$, au' to $a_{33i})$, and $(c, x_p, y_p, k_1$ to $k_3, p_1$ to $p_2)$ so that the residuals showed by the First to the Third Formulas will be small. Then, a combination of unknown parameters $(X_j, Y_j, Z_j)$, $(X_{oi}, Y_{oi}, Z_{oi}, a_{11i}$ to $a_{33i})$, and $(c, x_p, y_p, k_1$ to $k_3, p_1$ to $p_2)$ by which the First to the Third Formulas satisfy a convergence condition is calculated. This convergence condition is a condition in which the residuals are sufficiently small or a condition in which changes in the residuals from residuals of previous calculation are sufficiently small, that is, changes in the calculation results converge.

Advantages and Other Matters

The method described above uses the launching table 220 as a control point that is installed on a target of aerial photogrammetry, e.g., a ground surface, whereby it is possible to perform highly accurate aerial photogrammetry without using a conventionally used orientation target. In this technique, the location of the launching table 220 is determined by the TS 100 in positioning of the reflection prism 202 prior to the start of flight of the UAV 200. This positioning accompanies the process for tracking and positioning of the UAV 200 and is not performed for directly positioning the launching table 220. Thus, an additional operation for determining the location of the launching table 220 is not necessary. In addition, the location at which the launching table 220 is set up is freely selected, and extra work for locating the launching table 220 is not required.

This technique does not preclude use of an orientation target, which is conventionally performed. That is, this technique may be implemented by installing an orientation target on a ground surface and adding a constraining condition with respect to feature points extracted from images. In this case, the adjustment calculations are performed by using a location of an orientation target ($X_{Gj}$, $Y_{Gj}$, $Z_{Gj}$) (j=2, 3, 4, . . . ), as ($X_{Gj}$, $Y_{Gj}$, $Z_{Gj}$) in the Third Formulas, in addition to the location ($X_{G1}$, $Y_{G1}$, $Z_{G1}$) of the launching table 220.

Configuration of Hardware

Figure 4:
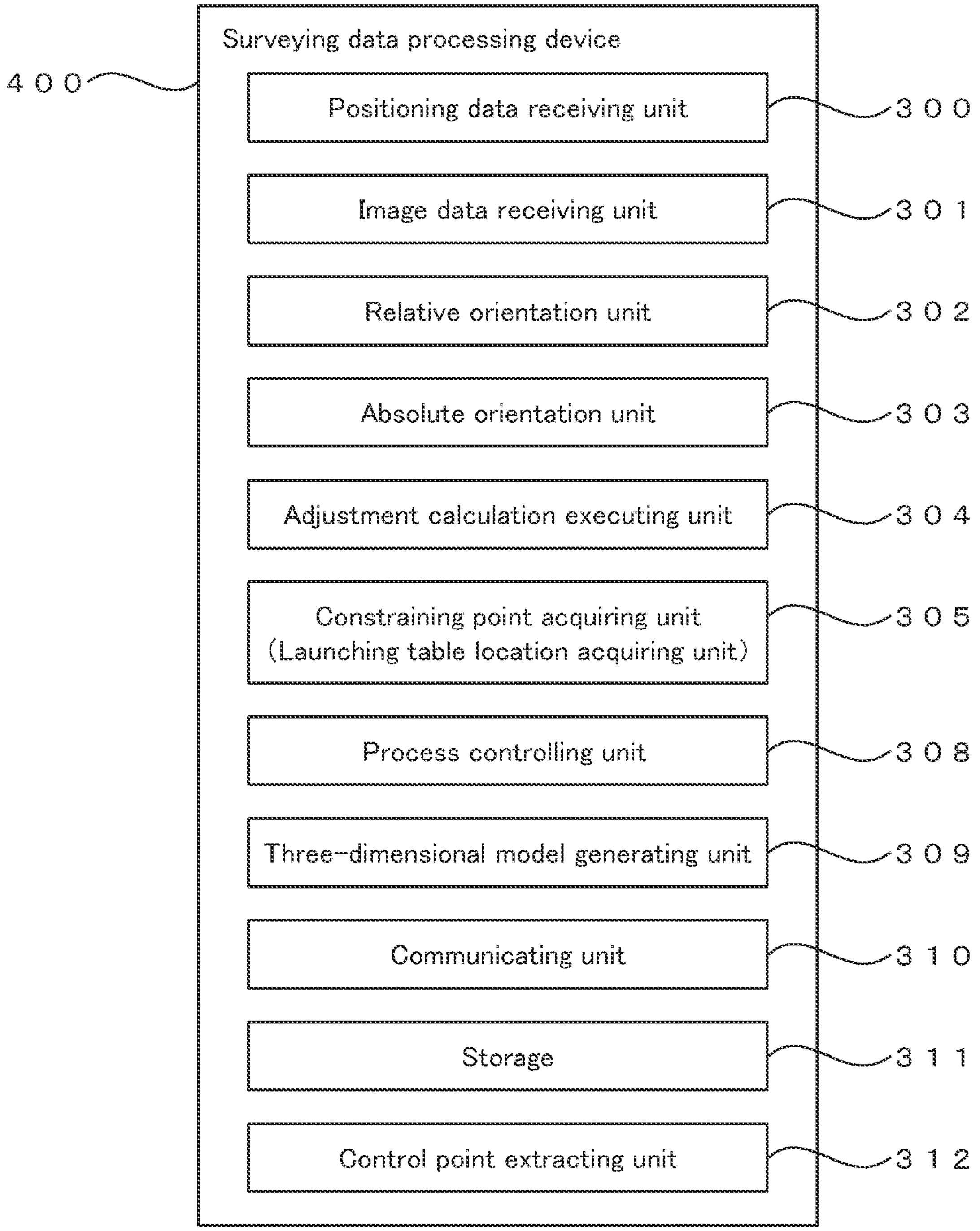
FIG. 4 is a block diagram of an embodiment.
Figure 5:
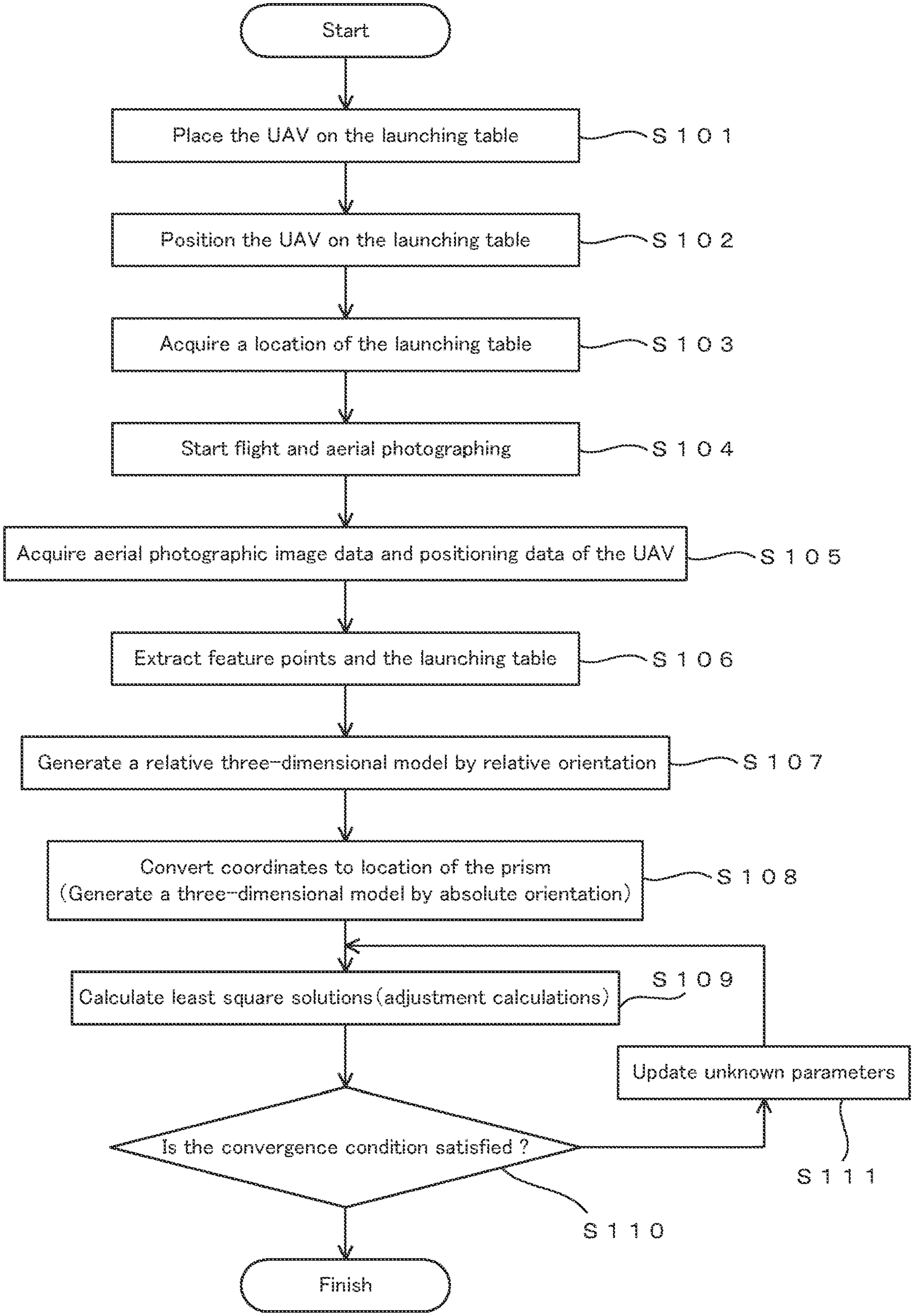
FIG. 5 is a flowchart showing an example of a processing procedure.

FIG. 4 shows a block diagram of the surveying data processing device 400 that performs (1) relative orientation, (2) absolute orientation, and (3) adjustment calculations, which are described above. The surveying data processing device 400 functions as a computer. The surveying data processing device 400 is constituted by using a personal computer (PC) or a work station (WS).

The surveying data processing device 400 may be constituted of a dedicated electronic circuit. For example, a part or the entirety of the surveying data processing device 400 can be constituted of an electronic circuit such as an FPGA. In a case of constituting the surveying data processing device 400 by using a PC or a WS, a user uses a user interface such as a graphical user interface (GUI) of the PC or of the WS to operate the surveying data processing device 400. The surveying data processing device 400 includes a positioning data receiving unit 300, an image data receiving unit 301, a relative orientation unit 302, an absolute orientation unit 303, an adjustment calculation executing unit 304, a constraining point acquiring unit 305, a process controlling unit 308, a three-dimensional model generating unit 309, a communicating unit 310, a storage 311, and a control point extracting unit 312.

The positioning data receiving unit 300 receives location data of the UAV 200 or of the reflection prism 202, which is positioned by the TS 100. This location data contains location of the reflection prism 202 on the launching table 220 prior to the start of flight and location ($X_{pi}$, $Y_{pi}$, $Z_{pi}$) in the absolute coordinate system of the reflection prism 202 at the photographing time of an image "i".

The image data receiving unit 301 receives image data of photographic images taken by the camera 201. This image data is received by the image data receiving unit 301 in association with the photographing time and data of the IMU mounted on the UAV 200, which is data of attitude of the UAV 200, at the photographing time. The exterior orientation parameters of the camera 201 of the UAV 200, that is, attitude and location of the camera 201 relative to the UAV 200, are already known. Thus, in the condition in which the attitude of the UAV 200 is clear, the attitude of the camera 201 at that time is determined.

The relative orientation unit 302 extracts multiple photographic images containing the same object from the image data received by the image data receiving unit 301 and subjects the extracted photographic images to the relative orientation described above. This process generates a relative three-dimensional model in which relative relationships between a great number of feature points extracted from each of the multiple photographic images, which are consecutively obtained, and exterior orientation parameters of the camera 201 taking the multiple photographic images, are determined. Then, the process calculates relative exterior orientation parameters of the camera corresponding to each of the photographic images. In the relative orientation, the location of the launching table 220 may be used as a constraining point.

The absolute orientation unit 303 uses the result of the relative orientation performed by the relative orientation unit 302, to perform the absolute orientation described above. In this process, a movement path S of the camera 201 in the relative orientation-based relative three-dimensional model is compared with a movement path S' of the UAV 200 or of the reflection prism 202 tracked by the TS 100. Then, scale adjustment, parallel movement, and rotational movement of the relative three-dimensional model are performed so that the difference between the movement path S and the movement path S' will be minimal. After the difference becomes minimal, a true scale is added to the relative three-dimensional model, and the direction in the absolute coordinate system that describes the movement path S is determined. In the absolute orientation, the location of the launching table 220 may be used as a constraining point.

The adjustment calculation executing unit 304 performs the processes of the adjustment calculations using the First to the Third Formulas. This process concurrently performs the bundle adjustment calculation using the First Formulas, an adjustment calculation using the Second Formulas for minimizing an error caused by the difference of the position between the camera 201 and the reflection prism 202, and a calculation relating to the constraining condition using the Third Formulas. As a result, three-dimensional coordinates of feature points extracted from images, and the exterior orientation parameters and the interior orientation parameters of the camera 201 corresponding to each of the images, are optimized.

The constraining point acquiring unit 305 acquires a location in the photographic image and a location in the absolute coordinate system, of the reflection table 220 or of the target display 224. The location of the reflection table 220 or of the target display 224 is acquired as follows. First, a location in the absolute coordinate system of the reflection prism 202 of the UAV 200 placed on the launching table 220 in the condition of ready for fight is measured by the TS 100. The position relationship between the reflection prism 202, and the reflection table 220 or the target display 224, in the condition in which the UAV 200 is placed on the launching table 220 is known. Thus, the location of the reflection table 220 or of the target display 224 is derived by determining the location of the reflection prism 202 of the UAV 200 placed on the launching table 220. This process and acquisition of the result of this process are performed by the constraining point acquiring unit 305.

The process controlling unit 308 controls the procedure and the timings of the processes performed by the surveying data processing device 400. The function of the process controlling unit 308 is implemented by a CPU of the hardware constituting the surveying data processing device 400, such as a PC or a WS. The three-dimensional model generating unit 309 generates a three-dimensional model on the basis of the photographic images taken by the camera 201, by using the three-dimensional coordinates of the feature points obtained as a result of the adjustment calculations. The generation of the three-dimensional model on the basis of the images is disclosed in, for example, Japanese Unexamined Patent Application Laid-Open WO 2011/070927, and Japanese Unexamined Patent Applications Laid-Open Nos. 2012-230594 and 2014-35702.

The communicating unit 310 communicates with an external device. In the case of constituting the surveying data processing device 400 by using a PC or a WS, the communicating unit 310 is implemented by using an interface function or a communication function of the PC or the WS that is used. The storage 311 stores, e.g., a program and data necessary to operate the surveying data processing device 400, and data obtained as a result of the operation of the surveying data processing device 400. In the case of constituting the surveying data processing device 400 by using a PC or a WS, the storage 311 is implemented by using a semiconductor memory or a hard disk unit of the PC or the WS that is used.

The control point extracting unit 312 extracts feature points, and the launching table 220 or the target display 224, which are to be used as control points, from images. Extraction of the feature points uses a technique of extracting feature points from images by use of, e.g., a Sobel filter or a Gaussian filter. The extraction of the launching table 220 is performed by using a publicly known image recognition technique.

Example of Processing Procedure

FIG. 7 is a flowchart showing an example of processing performed by the surveying data processing device 400. The program for executing the processing in FIG. 7 is stored in the storage 311 of the surveying data processing device 400 and is run by the process controlling unit 308. Alternatively, the program may be stored in an appropriate storage medium and may be provided therefrom.

First, the UAV 200 is placed on the launching table 220 (step S101). At this time, the positioning parts 221 and 222 are used so that the attitude and the position of the UAV 200 on the launching table 220 will have predetermined relationships. Herein, the position and the attitude are described in the absolute coordinate system.

Next, the UAV 200 is positioned by the TS 100 prior to start of flight (step S102). The TS 100 is installed at a known location, and references for the attitude of the TS 100 are determined in advance. In one example, longitude, latitude, and height above mean sea level of the location of the TS 100 are determined in advance, and it is preliminarily determined that a direction of the optical axis of the TS 100 is measured in terms of an altitude angle or a depression angle from a horizontal plane and an angle in a clockwise direction starting from the north as viewed from above in the vertical direction. In the operation in step S102, the TS 100 positions the reflection prism 202. The position relationships among the position of the UAV 200, e.g., the position of the IMU or the position of the center of gravity, the position of the reflection center of the reflection prism 202, the position of the projection center or of the optical origin of the camera 201, are already known information. In this state, the operation in step S102 reveals the locations of the UAV 200 and the camera 201.

After the location of the UAV 200 is obtained, the location of the launching table 220, in this example, the location of the center of the target display 224, is acquired (step S103). This process is performed by the constraining point acquiring unit 305.

The location of the launching table 220 is obtained as follows. At this stage, the location of the UAV 200 on the launching table 220 is measured by the TS 100. The relationships between the position of the UAV 200 and the attitude and the position of the launching table 220 are determined in step S101 and are known information. Thus, the location of the launching table 220 is obtained on the basis of the location data of the UAV 200 obtained in step S102.

The process can also be understood as follows. The position of the reflection prism 202 is already determined in step S101. The position relationship between the reflection prism 202, and the launching table 220 or the center of the target display 224, is preliminarily determined and is known information. Thus, the location of the launching table 220 is obtained by acquiring the location information of the reflection prism 202 of the UAV 200 placed on the launching table 220.

Next, flight of the UAV 200 is started, and an object of aerial photogrammetry, such as a ground surface or a building structure, is aerially photographed by using the camera 201 (step S104). Meanwhile, the TS 100 continues tracking and positioning the UAV 200 that is flying. The photographing is performed so that photographic images will include multiple images that contain the launching table 220.

After the aerial photographing is finished, data of photographic images obtained by the camera 201 and positioning data relating to the UAV 200, which is obtained by the TS 100, are acquired (step S105). The positioning data that is obtained prior to start of the flight of the UAV 200, which is the positioning data of the UAV 200 on the launching table 220, may be received at this stage. After the image data and the positioning data are acquired, the photographic images obtained by the camera 201 are associated with the times of photographing the corresponding photographic images and data of locations of the UAV 200 positioned by the TS 100 at the corresponding photographing times, and they are stored in the storage 311.

Next, feature points, and the launching table 220 or the target display 224, are extracted from the aerial photographic images (step S106). This process is performed by the control point extracting unit 312.

Thereafter, a three-dimensional model having no scale, that is, a relative three-dimensional model, is generated on the basis of the photographic images obtained by the UAV 200 (step S107). This process is performed by the relative orientation unit 302. This process generates a relative three-dimensional model of a photographed object by using a control point $P_j$, based on the principle in FIG. 2. Herein, the feature point that is extracted from the image is used as the control point $P_j$, but the launching table 220 can also additionally be used. This process performs the relative orientation and calculates relative exterior orientation parameters of the camera 201 corresponding to each of the images.

Then, scale adjustment, parallel movement, and rotational movement of the relative three-dimensional model are performed so that the movement path S of the camera 201 in the relative three-dimensional model, which is generated in step S107, will be fit to the movement path S' of the reflection prism 202 positioned by the TS 100. This process performs coordinate conversion to the location of the reflection prism 202, in the relative three-dimensional model, thereby adding a true scale to the relative three-dimensional model. (step S108). This process is performed by the absolute orientation unit 303.

As a result of the process in step S108, the relative three-dimensional model generated in step S107 is converted into a three-dimensional model that is described in the absolute coordinate system, and three-dimensional coordinates ($X_j$, $Y_j$, $Z_j$) in the absolute coordinate system of a feature point in each of the images and exterior orientation parameters ($X_{oi}$, $Y_{oi}$, $Z_{oi}$, an, to $a_{33i}$) in the absolute coordinate system of the camera corresponding to an image "i", are obtained. This process may use the location of the launching table 220 as a constraining condition.

Next, the adjustment calculations are performed (step S109). This process is performed by the adjustment calculation executing unit 304. This process calculates least-squares solutions of the First to the Third Formulas to optimize ($X_j$, $Y_j$, $Z_j$), ($X_{oi}$, $a_{11i}$ to $a_{33i}$), and (c, $x_p$, $y_p$, $k_1$ to $k_3$, $p_1$ to $p_2$). Meanwhile, the determination in step S110 is performed. If the convergence condition is satisfied, the processing finishes, and the values of the three-dimensional coordinates (Xj, Yj, Zj) of the feature point, the exterior orientation parameters ($X_{oi}$, $Y_{oi}$, $Z_{oi}$, $a_{11i}$ to $a_{33i}$), and the interior orientation parameters (c, $x_p$, $y_p$, $k_1$ to $k_3$, $p_1$ to $p_2$) are settled. If the convergence condition is not satisfied, unknown parameters ($X_j$, $Y_j$, $Z_j$), ($X_{oi}$, $Y_{oi}$, $a_{11i}$ to $a_{33i}$), and (c, $x_p$, $y_p$, $k_1$ to $k_3$, $p_1$ to $p_2$) are updated (step S111), and the adjustment calculations are performed again. In an actual case, the update of the unknown parameters is repeated many times, and the values ($X_j$, $Y_j$, $Z_j$), ($X_{oi}$, $Y_{oi}$, $a_{11i}$ to $a_{33i}$), and (c, $x_p$, $y_p$, $k_1$ to $k_3$, $p_1$ to $p_2$) are settled at the time the convergence condition is satisfied.

OVERALL SUMMARY

A relative three-dimensional model that describes the movement path S of the camera 201 is generated by the relative orientation. On the other hand, the reflection prism 202 mounted on the UAV 200 is positioned by the TS 100, and the movement path S' in the absolute coordinate system of the reflection prism 202 is determined in terms of measured values.

After the relative orientation is performed, the absolute orientation is performed. The absolute orientation is performed by subjecting the relative three-dimensional model to scale adjustment, parallel movement, and rotation so that the movement path S in the relative three-dimensional model will be fit to the movement path S' in the absolute coordinate system in terms of measured values. The fitting of the movement path S to the movement path S' in the absolute coordinate system provides direction and a true scale in the absolute coordinate system to the relative orientation-based relative three-dimensional model.

After the absolute orientation is performed, the adjustment calculations of the First to the Third Formulas is performed concurrently, to optimize the three-dimensional coordinates ($X_j$, $Y_j$, $Z_j$) of the feature point of the photographed object and to optimize the exterior orientation parameters ($X_{oi}$, $Y_{oi}$, $Z_{oi}$, au' to $a_{33i}$) and the interior orientation parameters (c, $x_p$, $y_p$, $k_1$ to $k_3$, $p_1$ to $p_2$) of the camera 201. At the time of performing the bundle adjustment calculation of the First Formulas, the adjustment calculation of the Second Formulas is performed concurrently. This reduces the influence of the errors on each of the parameters due to the difference of the position between the camera 201 and the reflection prism 202. In addition, the adjustment calculation of the Third Formulas relating to the constraining condition using the location data of the launching table 220 is also performed concurrently. This enables the First to the Third Formulas to rapidly converge and also enables obtaining high calculation accuracy.

In this technique, it is possible to generate a three-dimensional model of an object to be surveyed without using a large number of control points or orientation targets in which locations are determined in advance. However, due to not using a large number of control points in which locations are determined in advance, there may be cases in which a deviation or a cause of error in a parameter specific to a surveying site exists. In a case of using fixed interior orientation parameters, the deviation and the cause of error adversely affect the adjustment calculation, or more specifically, the bundle adjustment. In contrast, the technique of the present invention enables suppressing the adverse effect because the interior orientation parameters are not fixed and the adjustment calculations are performed also on the interior orientation parameters.

Other Matters

FIG. 1 shows the positioning parts 221 and 222 as means for physically determining the attitude and the position of the UAV 200 relative to the launching table 220. However, alternatively or additionally, an indication for determining the attitude and the position of the UAV 200 relative to the launching table 220 may be provided to the launching table 220. In this case, the UAV 200 is placed on the launching table 220 by referring to this indication.

The shape of the UAV 200 may be symmetric to a center axis, and a reflection prism may be disposed on the center axis. In a state in which this UAV 200 is placed on the launching table 220 in such a manner that the center axis of the UAV 200 coincides with the center of the launching table 220 or the center of the target display 224, the attitude of the UAV 200 relative to the launching table 220 when the UAV 200 is placed on the launching table 220 need not be obtained.

The launching table 220 can have any target display function that enables identifying it in the aerial photographic image. From this point of view, it is possible to provide a shape or color that is easy to identify, instead of providing the target display 224.

REFERENCE SIGNS LIST

100 denotes a total station (TS), 200 denotes a UAV, 201 denotes a camera, 202 denotes a reflection prism, 220 denotes a launching table, 221 denotes a positioning part, 222 denotes a positioning part, and 224 denotes a target display.

The invention claimed is:

1. A placement table for an unmanned aerial vehicle, on which an unmanned aerial vehicle is to be placed, the placement table comprising:

a target display function that constitutes an orientation point to be used in aerial photogrammetry; and one or both of a structure and an indication that determine a position of the unmanned aerial vehicle relative to the placement table in a condition in which a position of the unmanned aerial vehicle relative to the target display function prior to flight is determined.

2. The placement table for the unmanned aerial vehicle according to claim 1, wherein the unmanned aerial vehicle includes a reflection target to be used in laser positioning, and placing the unmanned aerial vehicle on the placement table determines a position relationship between the target display function and the reflection target.

3. The placement table for the unmanned aerial vehicle according to claim 2, wherein a location of the placement table is determined by positioning the reflection target.

4. A surveying method using the placement table for the unmanned aerial vehicle according to claim 1, the surveying method comprising:

a first step of measuring a location of the unmanned aerial vehicle in a condition of being placed on the placement table;

a second step of determining a location of the placement table on a basis of the result of the first step;

a third step of photographing the placement table and an object for aerial photogrammetry, from the unmanned aerial vehicle that is flying; and a fourth step of calculating three-dimensional data of the object on a basis of the location of the placement table, which is obtained in the second step, as well as photographic images that are obtained in the third step.

5. The surveying method according to claim 4, wherein a relationship between a position of the unmanned aerial vehicle and a position of the placement table in a condition in which the unmanned aerial vehicle is placed on the placement table, is preliminarily determined, and a location of the placement table is determined on a basis of the preliminarily determined relationship and a location of the unmanned aerial vehicle that is positioned in the condition of being placed on the placement table.

6. The surveying method according to claim 4, wherein the fourth step uses the placement table as an orientation point.

7. The surveying method according to claim 4, wherein the fourth step includes adjustment calculation that uses the location of the placement table as a constraining point to optimize exterior orientation parameters and interior orientation parameters of a camera that photographs the object for the aerial photogrammetry.

8. A surveying device according to claim 1 comprising a processor or circuitry, the processor or circuitry configured to:

receive location data of an unmanned aerial vehicle in a condition of being placed on the placement table for the unmanned aerial vehicle according to;

determine a location of the placement table on a basis of the location data of the unmanned aerial vehicle;

receive image data of photographic images of the placement table and an object for aerial photogrammetry, which are obtained by the unmanned aerial vehicle that is flying; and calculate three-dimensional data of the object for the aerial photogrammetry on a basis of the location of the placement table and the image data.

9. A surveying system using the placement table for the unmanned aerial vehicle according to claim 1, the surveying system comprising:

a unit that measures a location of the unmanned aerial vehicle in a condition of being placed on the placement table;

a unit that determines a location of the placement table on a basis of the location of the unmanned aerial vehicle;

a unit that photographs the placement table and an object for aerial photogrammetry, from the unmanned aerial vehicle that is flying; and a unit that calculates three-dimensional data of the object for the aerial photogrammetry on a basis of the location of the placement table and obtained photographic images.

10. A non-transitory computer according to claim 1 recording medium storing computer executable instructions, the computer executable instructions made to, when executed by a computer processor, causing the computer processor to:

receive location data of an unmanned aerial vehicle in a condition of being placed on the placement table for the unmanned aerial vehicle according to;

determine a location of the placement table on a basis of the location data of the unmanned aerial vehicle;

receive image data of photographic images of the placement table and an object for aerial photogrammetry, which are obtained by the unmanned aerial vehicle that is flying; and calculate three-dimensional data of the object for the aerial photogrammetry on a basis of the location of the placement table and the obtained photographic images.

* * * * *

UNITED STATES PATENT AND TRADEMARK OFFICE

CERTIFICATE OF CORRECTION

PATENT NO. : 11,221,216 B2
APPLICATION NO. : 16/963217
DATED : January 11, 2022
INVENTOR(S) : Sasaki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 30 days.

Signed and Sealed this
Sixteenth Day of August, 2022

Katherine Kelly Vidal

Katherine Kelly Vidal
*Director of the United States Patent and Trademark Office*